United States Patent [19]
Comeau

[11] 3,858,441
[45] Jan. 7, 1975

[54] SOIL TESTING APPARATUS
[75] Inventor: Henri Jules Comeau, Ville St. Laurent, Quebec, Canada
[73] Assignees: Henri Jules Comeau, Quebec, Canada; Clarence W. Welti, Glastonbury, Conn.
[22] Filed: July 12, 1973
[21] Appl. No.: 378,651

[52] U.S. Cl. .................. 73/88 E, 73/151, 138/93
[51] Int. Cl. ............................................ G01n 33/24
[58] Field of Search .............. 73/84, 85, 88 E, 151; 138/93

[56] References Cited
UNITED STATES PATENTS

| | | | |
|---|---|---|---|
| 2,957,341 | 10/1960 | Menard | 73/84 |
| 3,270,469 | 9/1969 | DeBiton | 138/93 |
| 3,442,122 | 5/1969 | Broise et al. | 73/151 |
| 3,442,123 | 5/1969 | Broise | 73/151 |
| 3,772,911 | 11/1973 | Ruppeneit et al. | 73/88 E |

*Primary Examiner*—James J. Gill
*Assistant Examiner*—Anthony V. Ciarlante
*Attorney, Agent, or Firm*—Alan Swabey; Robert E. Mitchell

[57] ABSTRACT

The invention relates to a system for the in situ measurement of the mechanical properties for soils of foundations. The system consists of a probe means with a generally cylindrical inflatable membrane and a lowering tube for lowering the probe into a bore hole in the ground where the mechanical properties of the soils are to be measured. Means are provided to fill the membrane with a non-compressible fluid, such as water, and further means are provided to supply measured quantities of the fluid to the membrane after it is filled to thereby inflate the membrane. The volume of fluid supplied under pressure is recorded along with the pressures under which the corresponding volumes are supplied. Preferably, the membrane is non-inflatable in the longitudinal direction thereof and inflatable to only a predetermined extent in the transverse or radial direction thereof. The disclosure also teaches a preferred structure of a probe and a membrane for the probe.

5 Claims, 7 Drawing Figures

Patented Jan. 7, 1975

Patented Jan. 7, 1975
3,858,441
3 Sheets-Sheet 3
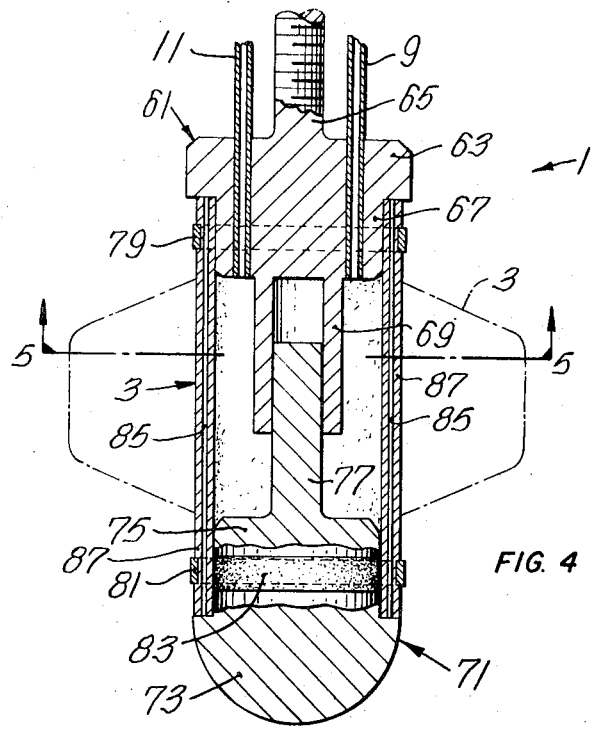
FIG. 4
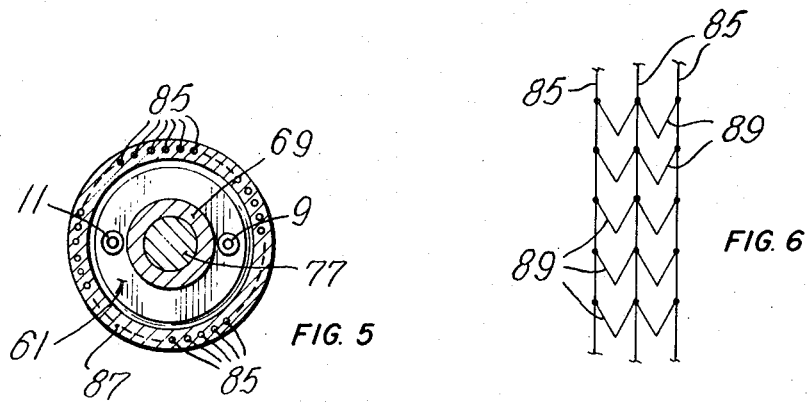
FIG. 5
FIG. 6
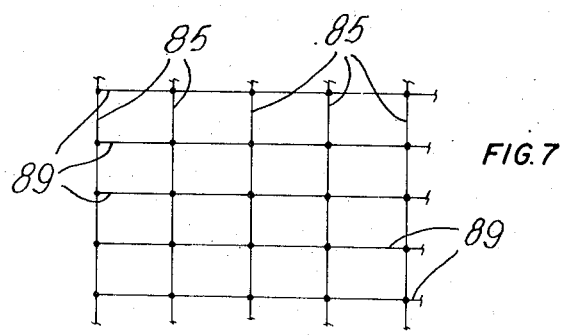
FIG. 7

3,858,441

SOIL TESTING APPARATUS

BACKGROUND OF THE INVENTION

1. Field of the Invention

This invention relates to a novel system for the in situ measurement of the mechanical properties of soils. In addition, the invention relates to a method for the in situ measurement of soils using the inventive system, and to a novel probe means for use in the novel system.

2. Statement of the Prior Art

Experience and modern technique prove that conventional methods of field testing give a relatively poor indication of the existing mechanical properties of subsoils to carry foundations. In consequence, for greater precision, laboratory tests on samples of the soil are generally used. It is well known, that in this case, the condition of the sample is the most important factor. But, it is extremely difficult, if not impossible in certain cases, to obtain intact samples which are undisturbed so as to be sufficiently representative of the real condition of the soil.

This is particularly true in connection with grannular materials such as sands, gravels, and moraines which can be very heterogeneous. The same problem exists in the case of saturated silts (limon) and sensitive clays where it is necessary to resort to special samplings. This method is also very expensive and does not answer the exigencies that a rational soil study imposes before permitting the planning of foundations of the project under study.

The in situ measurement of soil properties is known as can be seen in U.S. Pat. Nos. 2,824,445, 2,957,341, and 3,175,392, however, applicant provides a novel system for such measurements, as well as a novel probe means for use in such a system.

SUMMARY OF THE INVENTION

It is an aim of the present invention to provide for furnishing precise data and information as to the existing mechanical qualities of a foundation soil by use of a novel probe means for the "in situ" measurement of the soil properties. Such in situ testing of a soil or rock in its natural undisturbed state of deposition contributes to a precise measurement of the existing mechanical properties and consequently the representative properties of the soil, and only samples serving to identify the geological statisterigraphic characteristics are required.

In accordance with the invention, a system for the in situ measurement of the mechanical properties of soils in the ground comprises:

a probe means comprising a generally cylindrical inflatable membrane;

means for inserting the probe means in a bore hole in the ground;

means for filling the membrane with a noncompressible fluid;

means for supplying measured volumes of said noncompressible fluid to said membrane under pressure after it is filled to thereby inflate said membrane;

and means for measuring the volumes of fluid supplied under pressure and the pressures under which the corresponding volumes are supplied.

The membrane is preferably substantially noninflatable in the longitudinal direction of the probe and is inflatable in the transverse direction of the probe. The membrane may also be made to be inflatable to only a predetermined extent in the transverse or radial direction.

BRIEF DESCRIPTION OF THE DRAWINGS

The invention will be better understood by an examination of the following description, together with the accompanying drawings, in which:

FIG. 4 shows the details of the probe means in accordance with the invention;

FIG. 5 is a cross section through line 5—5 of FIG. 4 to illustrate the preferred construction of the membrane;

FIG. 6 shows the arrangement of the nylon threads of the membrane when the membrane is not inflated; and FIG. 7 shows the arrangement of FIG. 6 when the membrane is fully inflated.

DETAILED DESCRIPTION OF THE DRAWINGS

Figure 1:
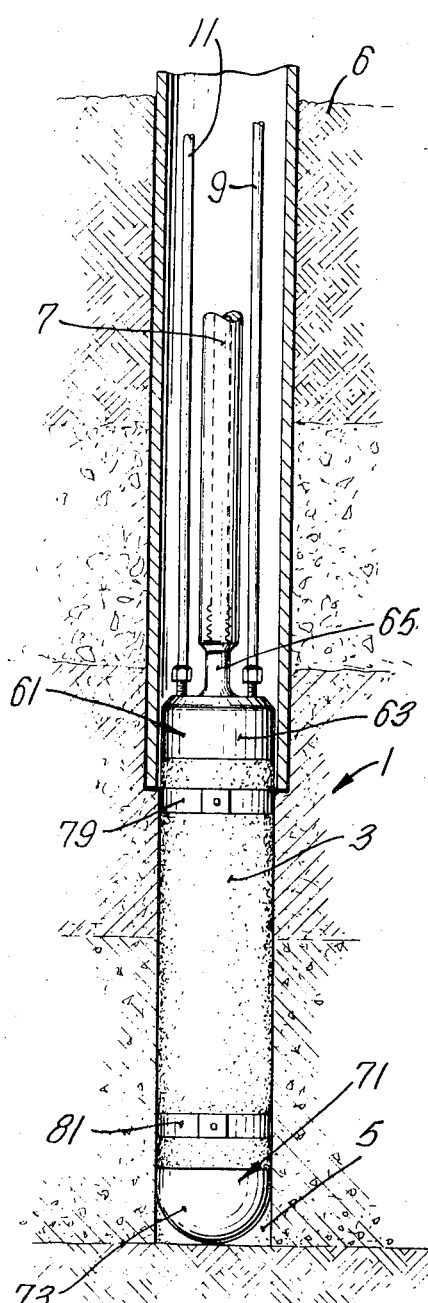
FIG. 1 shows a probe in a bore hole in the ground with its membrane in its deflated condition.

Referring now to FIG. 1, the probe means, indicated generally at 1, comprises a generally cylindrical membrane 3 and is lowered into a bore hole 5 under the surface of the ground 6 by means of a rigid lowering tube 7. The probe means comprises a pressure line 9 for supplying fluid under pressure to the membrane as will be discussed below, and a return line 11. The pressure and return lines can be rubber hose or similar means.

Figure 2:
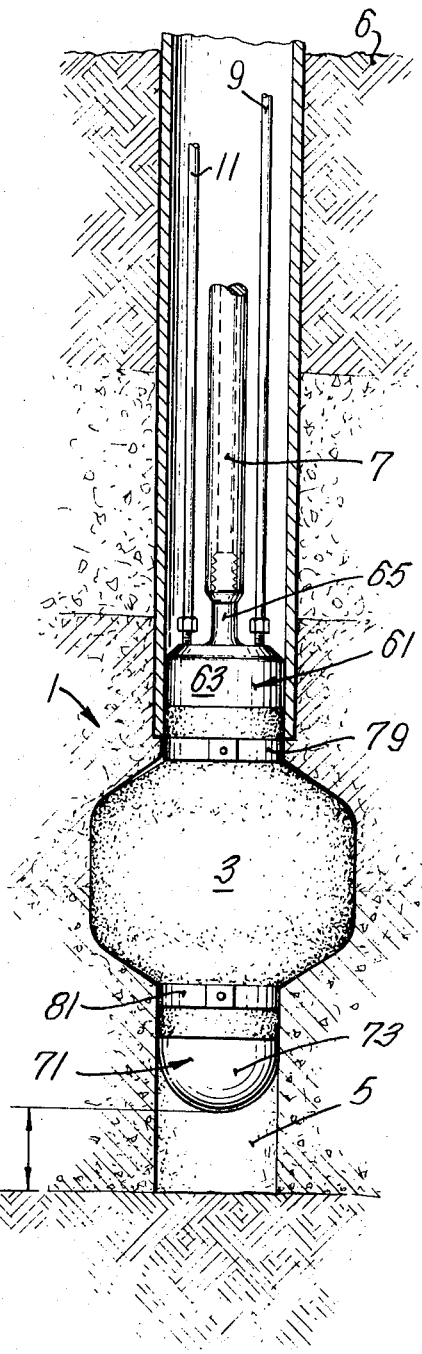
FIG. 2 shows the membrane in its inflated condition.

FIG. 2 shows the membrane in its inflated condition. As can be seen, the membrane does not inflate in the longitudinal direction of the probe. Although the length of the probe decreases in its longitudinal direction, the length of the membrane, while distorted, retains substantially the same surface area as when the probe is not inflated. However, the membrane is inflated in the plane which is perpendicular to the longitudinal direction of the probe, and it expands evenly in all directions in this plane because of the construction of the membrane which is discussed below.

Figure 3:
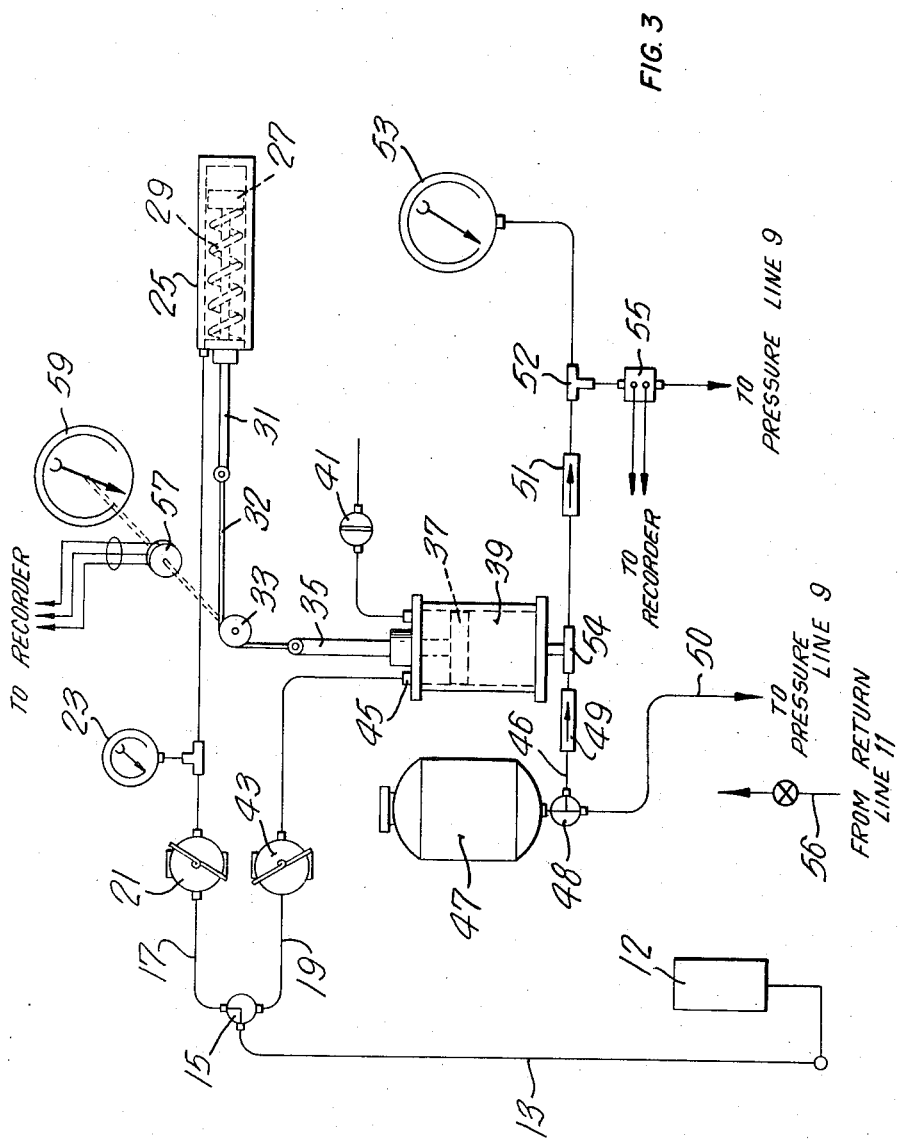
FIG. 3 is a schematic diagram of the system in accordance with the invention.

FIG. 3 illustrates the control and measuring portion of the inventive system. In FIG. 3, 11 is a source of compressed gas, such as compressed air or $CO_2$, which is fed, through line 13, to selector valve 15. The selector valve 15 selects either the air cylinder line 17 (as shown in the figure) or the pressure load line 19.

In line 17, the compressed gas passes through regulator 21. A pressure gauge 23 can be provided to give an indication of the pressure in the line, and the gas is then passed to air cylinder 25. The cylinder 25 is air tight and comprises a rod and piston arrangement 31, 27. Spring means 29 urge the piston towards the left hand side of the cylinder, while compressed gas, applied on the left hand edge of the piston, forces the piston to the right hand side of the cylinder by overcoming the force of the spring 29. Rod 31 is connected to rod 35 via chain 32 over a sprocket 33. The rod 35 is part of the rod and piston arrangement 35, 37 in volumetric cylinder 39.

When the selector valve 15 is set to its other position, compressed gas enters the line 19 and passes through regulator 43 to inlet 45 of volumetric cylinder 39. The compressed gas will urge piston 39 in its downward direction.

Reservoir 47 contains a non-compressible fluid such as water in a great enough amount as to fully inflate the membrane 3 of the probe 1. The output of the reservoir is connected to selector valve 48 by means of which the reservoir can communicate with either membrane filling line 50 or pressure filling line 46. The line 50 is a continuation of pressure line 9 of the probe means shown in FIGS. 1 and 2.

Line 46 contains one way valves 49 and 51 on either side of the volumetric cylinder T-connector 54. The output of valve 51 communicates with T-connector 52 which has one output connected to pressure gauge 53 and another output connected to pressure transducer 55. The output of the transducer 55 leads to pressure line 9 of the probe 1 to the input of a recorder. Sprocket 33 is connected, by a mechanical linkage, to a rotation measuring device such as a linear potentiometer 57. The device 57 is connected to the input of a recorder which indicates the measurement sensed by 57.

To illustrate the way in which the system works, one cycle of operation will be described. After the probe is lowered into a bore hole, the selector valve 48 is set so that the reservoir output is connected to line 50. The compressed fluid will flow into the membrane under atmospheric pressure to fill the membrane without distorting it. When fluid appears in bleed outlet 56, which is connected to return line 11 of the probe, the valve 48 is reset so that the reservoir is no longer connected to the line 50.

The selector valve 15 is then set as shown in FIG. 3 and compressed gas is fed, through lines 13 and 17, to the inlet of the cylinder 25. The compressed gas will force piston 27 to the right hand end of the cylinder so that rod 31 will be pulled in the right hand direction. Because of the connection between rod 31 and rod 35, through chain 32, piston 37 will be pulled by leaving a vacuum underneath it in the volumetric cylinder 39. Thus, the pressure on the left hand side of one way valve 49 is greater than the pressure on the right hand side thereof so that the valve will open, and fluid will flow from the reservoir 47 to the volumetric cylinder 39 due to the suction force created by the vacuum in the cylinder.

The air cylinder is so adjusted that, when the piston 27 is at the extreme right hand end of the air cylinder, the piston 37 will be at the top of the volumetric cylinder 39. When piston 37 is in this position, the measuring transducer device 57 will be in its zero position, and the indicator 59 will give a zero reading.

Fluid will flow from the reservoir 47 to the cylinder 39 until the cylinder is completely filled up.

Selector valve 15 is then set so that line 13 communicates with line 19. The compressed gas is fed to cylinder inlet 45, and the pressure of the compressed gas will force the piston 37 in the downward direction. This will force the fluid out of the cylinder and down through one way valve 51 to pressure line 9 of the probe 1. It is noted that fluid will not be forced back to the reservoir by this action because one way valve 49 will not permit the flow of fluid in the leftward direction.

When the membrane of the probe expands, it displaces the soil adjacent to it, and the volume of the soil displaced is, of course, equal to the volume of expansion of the membrane. The second above volume is simply equal to the volume of the non-compressible fluid supplied under pressure, and this volume is measured on volume indicator 59. At the same time, the pressure under which the fluid is supplied to the membrane is measured in pressure gauge 53, which is also transmitted to transducers 52 and 57 which in turn actuate the automatic chart recorder. By increasing the pressure in steps and recording the pressures and their associated volumes, it is possible to construct a graph of pressure vs. volume, and this graph can then be used to determine the properties of the soil of foundation under test.

As will be clear, when automatic recording devices are included, volumes and corresponding pressures will be automatically recorded.

Referring now particularly to FIG. 4, the probe 1 is made up of a cylindrical body 61 having an annular head portion 63. Stem 65 extends upwardly from the center of head 63. The body 61 also has a downwardly extending collar 67 of reduced diameter, and extending downwardly from the central part of the collar 67 is a tubular portion 69. The collar 67 receives the end of the cylindrical membrane 3 which abuts the head 63. The other end 71 of the probe has a hemispherical nose 73 and an upwardly extending annular collar 75 which fits in the lower end of the membrane 3. Centrally extending from the collar 75 is a stem or rod 77 which fits slidably within the tubular portion 69.

A clip or band 79 surrounds the membrane 3 where it is superimposed on the collar 67. The band serves the purpose of retaining and sealing the membrane to the collar 67.

Likewise, a band 81 surrounds the membrane at the point where it is superimposed on the collar 75 of the nose reserved to retain the membrane on this collar. The collar 75 is provided with knurling 83 which helps to grip and seal the membrane in contact with it. Preferably, the membrane is in tight fitting engagement with both collars.

The body 61 may be made of steel, brass, aluminum, or metal as suitable as is the nose 73.

The bands 79 and 81 are made of steel or other suitable metal.

The preferred construction of the membrane is shown in FIGS. 5, 6 and 7. In these figures, 85 is a plurality of nylon strands extending in the longitudinal direction of the membrane. The strands are embedded in an elastomeric or like material 87.

Attached to the longitudinal strands 85, at spaced intervals thereof, are horizontal strands 89. The strands 89 are all of equal length so that, when the membrane is inflated, its outer surface will expand by equal amounts at all places on its outer surface. In addition, as the nylon strands will not stretch, the membrane will not expand in its longitudinal direction, and will expand by only a predetermined amount in the direction perpendicular to its longitudinal direction.

Returning now to FIG. 4, as the membrane cannot expand in the longitudinal direction, when fluid under pressure is applied to the filled membrane, it will expand only in the radial direction. The inflation in the outward direction will cause the length of the membrane to decrease (although the length of the outer surface area of the membrane remains substantially unchanged) and the decrease in length will be taken up by the sliding inwards of the rod 77 in the cylinder 69.

Thus, expansion of the membrane in the longitudinal direction is prevented, and expansion in the radial direction takes place at an even rate throughout the membrane's outer surface.

Although a preferred embodiment has been described above, this was for the purpose of illustrating, but not limiting, the invention. Various modifications which will come readily to the mind of one skilled in the art are within the scope of the invention as defined in the appended claims.

I claim:

1. A system for the in situ measurement of the mechanical properties of soils in the ground comprising;

a probe means comprising a generally cylindrical inflatable membrane;

means for inserting the probe means in a bore hole in the ground;

means for filling the membrane with a non-compressible fluid;

means for supplying measured volumes of said non-compressible fluid to said membrane under pressure after it is filled to thereby inflate said membrane; and means for measuring the volumes of the fluid supplied under pressure and the pressures under which the corresponding volumes are supplied;

characterized in that said membrane comprises a plurality of longitudinal strands extending in the longitudinal direction of the membrane and disposed with equal horizontal spacing between strands;

the length of each of said longitudinal strands being substantially equal to the length of the membrane, said longitudinal strands being non-expandable in the longitudinal direction;

said longitudinal strands being embedded in an elastomeric material;

and a plurality of horizontal strands embedded in said elastomeric material;

each of said horizontal strands being joined to two adjacent longitudinal strands;

said horizontal strands being equally spaced in the longitudinal direction of said membrane;

said horizontal strands all being of equal length;

whereby said membrane is substantially non-inflatable in the longitudinal direction of the membrane and is inflatable only to a controlled extent in the transverse or radial direction thereof.

2. A system as defined in claim 1 wherein said probe means comprises a first collar for receiving one end of said membrane;

a second collar for receiving the other end of said membrane;

a rod extending inwardly from said first collar;

a cylinder extending inwardly from said second collar;

said rod fitting in said cylinder in sliding engagement therewith;

whereby, when said membrane extends in the transverse direction thereof, said rod will slide in said cylinder to thereby decrease the length of said membrane, under inflation.

3. A system as defined in claim 1 wherein said means for supplying measured quantities of said fluid comprises:

a volumetric cylinder for containing said non-compressible fluid and comprising inlet means and outlet means;

said outlet means of said cylinder communicating with an inlet means of said membrane;

a piston slidable in said cylinder and having a face adjacent the inlet means of said cylinder;

and means for supplying gas under pressure to said inlet means of said cylinder, whereby, when gas under pressure is thereto supplied, said piston will be forced towards said outlet means of said cylinder thereby pushing the fluid out of said cylinder through said outlet means of said cylinder and to the inlet means of said membrane.

4. A system as defined in claim 3 and further comprising means for measuring the movement of said piston to thereby measure the volume of fluid supplied to said membrane.

5. A system as defined in claim 3 and comprising a pressure gauge between the outlet means of said cylinder and the inlet means of said membrane to measure the pressure under which fluid is supplied to said membrane.

* * * * *